United States Patent
Hurley et al.

(10) Patent No.: US 8,600,205 B2
(45) Date of Patent: Dec. 3, 2013

(54) OPTICAL FIBER ARRAY CABLES AND ASSOCIATED FIBER OPTIC CABLES AND SYSTEMS

(75) Inventors: William C. Hurley, Hickory, NC (US);
Martyn N. Easton, Lenoir, NC (US);
Michael Sauer, Corning, NY (US);
David A. Seddon, Hickory, NC (US)

(73) Assignee: Corning Cable Systems, Hickory, NC (US)

( * ) Notice: Subject to any disclaimer, the term of this patent is extended or adjusted under 35 U.S.C. 154(b) by 33 days.

(21) Appl. No.: 13/131,976

(22) Filed: May 31, 2011

(65) Prior Publication Data
US 2012/0288245 A1 Nov. 15, 2012

Related U.S. Application Data

(63) Continuation of application No. PCT/US2009/066401, filed on Dec. 2, 2009.

(60) Provisional application No. 61/119,168, filed on Dec. 2, 2008.

(51) Int. Cl.
*G02B 6/44* (2006.01)

(52) U.S. Cl.
USPC ............................................. 385/101

(58) Field of Classification Search
USPC ............................................. 385/101
See application file for complete search history.

(56) References Cited

U.S. PATENT DOCUMENTS

| | | | |
|---|---|---|---|
| 5,319,730 A | 6/1994 | Rasanen et al. | 385/114 |
| 5,448,669 A | 9/1995 | Dunn et al. | 385/101 |
| 5,469,523 A * | 11/1995 | Blew et al. | 385/101 |
| 5,544,270 A | 8/1996 | Clark et al. | 385/101 |
| 5,651,081 A | 7/1997 | Blew et al. | 385/101 |
| 5,668,912 A | 9/1997 | Keller | 385/100 |
| 5,745,627 A | 4/1998 | Arroyo et al. | 385/101 |
| 5,913,003 A | 6/1999 | Arroyo et al. | 385/101 |
| 6,049,647 A | 4/2000 | Register et al. | 385/101 |
| 6,236,789 B1 * | 5/2001 | Fitz | 385/101 |
| 6,249,628 B1 | 6/2001 | Rutterman et al. | 385/106 |
| 6,249,629 B1 * | 6/2001 | Bringuier | 385/113 |
| 6,314,224 B1 | 11/2001 | Stevens et al. | 385/113 |
| 6,363,192 B1 | 3/2002 | Spooner | 385/101 |
| 6,427,042 B1 * | 7/2002 | Dyke et al. | 385/100 |
| 6,463,198 B1 | 10/2002 | Coleman et al. | 385/101 |

(Continued)

FOREIGN PATENT DOCUMENTS

| | | | | |
|---|---|---|---|---|
| CN | 201011626 Y | 1/2008 | | H01B 11/22 |
| DE | 19525424 A1 | 1/1997 | | H01B 11/22 |
| EP | 0562770 A2 | 9/1993 | | H01B 11/22 |

OTHER PUBLICATIONS

The State Intellectual Property Office of the People's Republic of China, First Office Action, Application No. 200980153333.5, Sep. 28, 2012, 6 Pages.

*Primary Examiner* — Omar Rojas
(74) *Attorney, Agent, or Firm* — Russell S. Magaziner

(57) ABSTRACT

An optical system that allows for the flexible location of an optical device that is coupled to a patch panel in a wiring closet or other optical signal source through a series of fiber optic cables and optical connections, or the flexible location of an array of such optical devices. Array cables have optical and electrical conductors to provide electrical power as well as optical data in optical systems.

2 Claims, 13 Drawing Sheets

(56) References Cited

U.S. PATENT DOCUMENTS

| | | | |
|---|---|---|---|
| 6,738,547 B2 | 5/2004 | Spooner | 385/101 |
| 6,752,657 B2 | 6/2004 | Gehrke et al. | 439/577 |
| 6,813,422 B1 * | 11/2004 | Krishnamurthy et al. | 385/109 |
| 6,847,767 B2 | 1/2005 | Hurley et al. | 385/101 |
| 6,922,511 B2 | 7/2005 | Rhoney et al. | 385/106 |
| 6,931,183 B2 | 8/2005 | Panak et al. | 385/101 |
| 6,965,718 B2 | 11/2005 | Koertel | 385/101 |
| 7,127,144 B2 | 10/2006 | Lee | 385/101 |
| 7,272,281 B2 | 9/2007 | Stahulak et al. | 385/101 |
| 7,277,615 B2 | 10/2007 | Greenwood et al. | 385/100 |
| 7,371,014 B2 | 5/2008 | Willis et al. | 385/89 |
| 7,401,985 B2 | 7/2008 | Aronson et al. | 385/89 |
| 7,409,127 B1 | 8/2008 | Hurley et al. | 385/101 |
| 7,415,181 B2 | 8/2008 | Greenwood et al. | 385/100 |
| 7,454,107 B2 | 11/2008 | Miller et al. | 385/113 |
| 7,471,862 B2 | 12/2008 | Bringuier et al. | 385/113 |
| 7,499,616 B2 | 3/2009 | Aronson et al. | 385/100 |
| 7,548,675 B2 | 6/2009 | Tatum et al. | 385/100 |
| 7,693,375 B2 | 4/2010 | Freeland et al. | 385/100 |
| 7,828,918 B2 * | 11/2010 | Vondracek et al. | 148/598 |
| 8,041,166 B2 * | 10/2011 | Kachmar | 385/103 |
| 2002/0110399 A1 | 8/2002 | Murata | 385/101 |
| 2008/0292253 A1 | 11/2008 | Keller | 385/101 |
| 2009/0041413 A1 * | 2/2009 | Hurley | 385/101 |

* cited by examiner

OPTICAL FIBER ARRAY CABLES AND ASSOCIATED FIBER OPTIC CABLES AND SYSTEMS

RELATED APPLICATIONS

This application is a continuation of International Application No. PCT/US09/66401, filed Dec. 2, 2009, which claims the benefit of priority to U.S. Provisional Application No. 61/119,168, filed Dec. 2, 2008, both applications being incorporated herein by reference.

The present application is related to U.S. application Ser. No. 11/891,008, filed Aug. 8, 2007, the entire contents of which are hereby incorporated by reference.

TECHNICAL FIELD

The present disclosure relates generally to assemblies that allow for the flexible location of an optical device within an optical communications network, and array cables for providing fiber optic data and power transmission.

SUMMARY

According to one embodiment, a fiber optic array cable comprises a polymer jacket having a cavity; a polymer tube disposed within the jacket; a plurality of optical fibers disposed within the tube; and a pair of electrical conductors disposed within the cavity of the jacket and outside of the tube. The plurality of optical fibers convey fiber optic communications, while the electrical conductors are capable of providing power to various components in communications networks. The jacket and the polymer tube can be constructed of polymers such as PVC.

According to another embodiment, a fiber optic array cable comprises a polymer jacket having a cavity, a pair of opposed generally flat surfaces, and a pair of curved end surfaces; a plurality of optical fibers disposed within the cavity; and a pair of electrical conductors encased within the jacket and on opposite sides of the cavity.

Those skilled in the art will appreciate the above stated advantages and other advantages and benefits of various additional embodiments reading the following detailed description of the embodiments with reference to the below-listed drawing figures.

BRIEF DESCRIPTION OF THE DRAWINGS

The present embodiments are illustrated and described herein with reference to the various drawings, in which like reference numbers are used to denote like system/assembly components and/or method steps, as appropriate, and in which.

DETAILED DESCRIPTION

In various exemplary embodiments, the present invention provides an optical system that allows for the flexible location of an optical device that is coupled to a patch panel in a wiring closet or other optical signal source through a series of fiber optic cables and optical connections, or the flexible location of an array of such optical devices.

Figure 1:
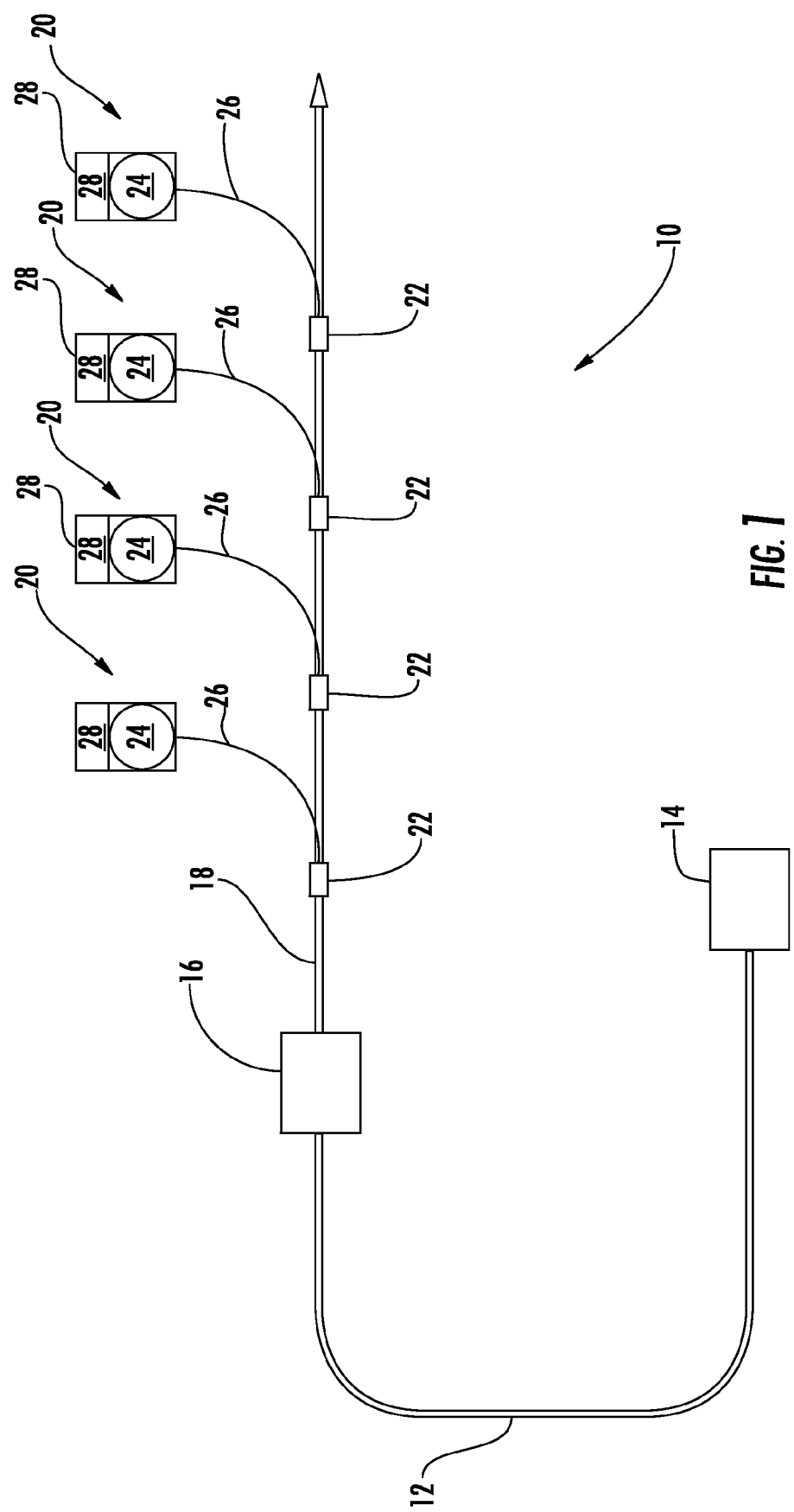
FIG. 1 is a schematic view of a first exemplary embodiment of an optical system of the present invention, the optical system including one or more retractable optical fiber tether assemblies.

A first embodiment of the optical system, illustrated in FIG. 1, includes, in part, one or more retractable optical fiber tether assemblies that each allows varying lengths of tether cable to be pulled and used. The retraction device of each of the optical tether assemblies may be disposed mid-tether cable, or may terminate the respective tether cable and incorporate the given optical device. In the first exemplary WLAN application, each of the retractable optical fiber tether assemblies includes an integral transceiver and associated software. Thus, each of the retractable optical fiber tether assemblies functions as an antenna. The associated fiber optic cable carries both optical fiber to provide optical continuity and copper wire to provide electrical conductivity to the antenna array.

Referring to FIG. 1, in one exemplary embodiment, the optical system 10 of the present invention includes a tail cable 12 that optically couples a patch panel in a wiring closet or other optical signal source 14 at one location to multiple optical connectors, a coupler, or the like 16 at another location. These locations may be separated by a distance of feet, yards, miles, etc. An array cable 18 optically couples the optical connectors, coupler, or the like 16 to one or more retractable tether cable assemblies 20 at one or more access points 22, such as one or more FLEXNAPS™ or the like. Optionally, the tail cable 12 and the array cable 18 are integrally formed. The array cable 18 includes a pulling grip for pulling the array cable 18 over distances, through walls, ceilings, etc., typically through a conduit. The retractable tether cable assemblies 20, which are preferably pre-connectorized, then bring the optical signal to multiple other locations. The retractable tether cable assemblies 20 provide location flexibility and obviate the need for neatly coiling the tether cable, such that an array of optical devices may be installed with minimal effort and expense. The retractable tether cable assemblies 20 are also easier and cheaper to package and ship than conventional tether cables. Each of the retractable tether cable assemblies 20 includes a retraction mechanism 24, one or more fiber optic cables 26, and an optical device 28, as described in greater detail herein below. The optical device 28 may be one or more optical connectors or ports, a FLEX-NAP™, a transceiver and associated software in the exemplary WLAN application (also described in greater detail herein below), etc.

Figure 2:
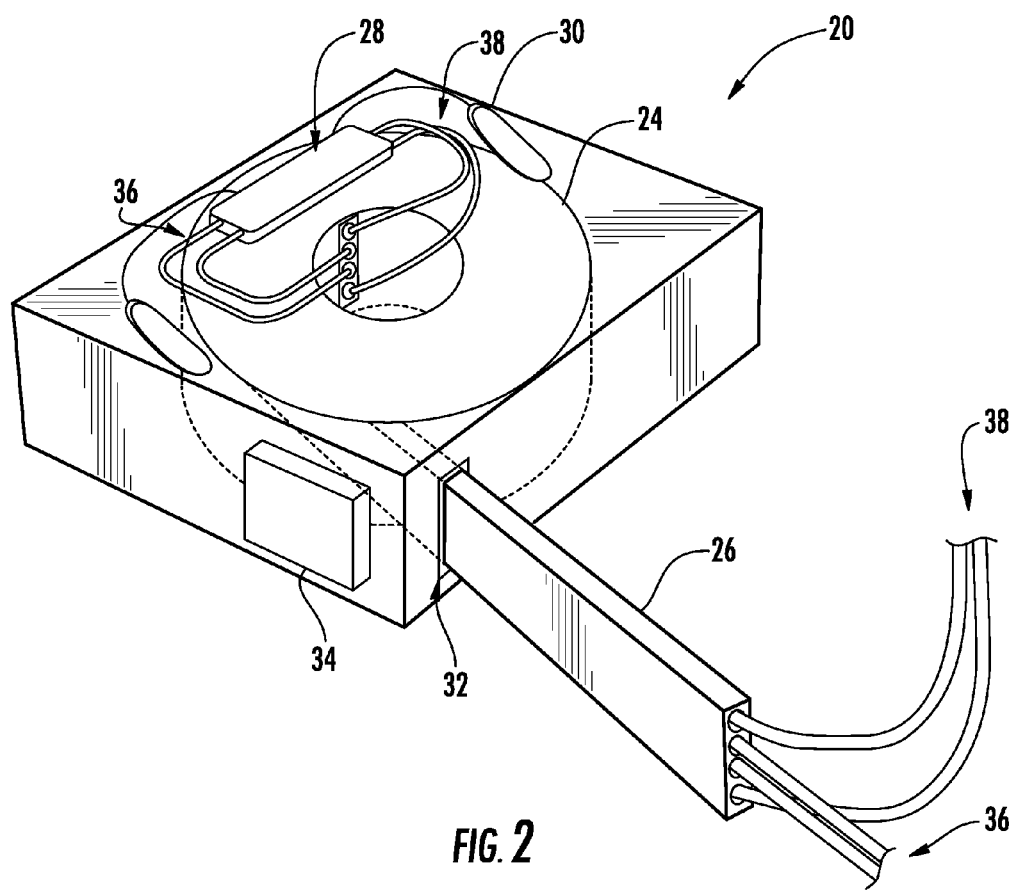
FIG. 2 is a perspective view of one exemplary embodiment of one of the retractable optical fiber tether assemblies of FIG. 1, the retractable optical fiber tether assembly including a retraction mechanism, a tether cable, and an integrated optical device (a transceiver and associated software are illustrated).

Referring to FIG. 2, in one exemplary embodiment, the retractable tether cable assembly 20 includes a housing 30. The retraction mechanism 24 is disposed within the housing 30, as is the optical device 28. Preferably, the retraction mechanism 24 includes a spool and spring mechanism or the like that is operable for alternatively feeding out or taking up tether cable 26 through a port 32 manufactured into the housing 30. The retraction mechanism 24 also includes a locking mechanism 34 that partially protrudes through the housing 30 and is operable for selectively enabling/disabling the feeding out/taking up of the tether cable 26. A comparable retraction mechanism that is suitable for use with the present invention is disclosed in commonly-assigned U.S. Pat. No. 6,915,058 to Pons, the contents of which are incorporated in full by reference herein. Although a single-port housing 30 is illustrated in FIG. 2, a multi-port housing 30 could also be used, allowing the tether cable 26 to be fed out or taken up from multiple sides of the housing 30 at once. In such an embodiment, the housing 30 and retraction mechanism 24 are disposed mid-tether cable, and the optical device 28 represents a separate component disposed at the terminating end of the tether cable 26. As illustrated in FIG. 2, the optical device 28 is a transceiver and associated software which are disposed within the housing 30. Alternatively, the transceiver and associated software are disposed on an outer surface of the housing 30. Because the transceiver is both optical and electrical, the tether cable 26 carries both optical fiber 36 to provide optical continuity and copper wire 38 to provide electrical conductivity to the transceiver. As described above, the optical device 28 could be any optical component, such as one or more optical connectors or ports, a FLEXNAP™, etc. As described in greater detail herein below, the tether cable 26 may also carry one or more strength members, one or more anti-flexion members, etc., and may be of a substantially flat shape, a substantially round shape, etc. All of these characteristics make the retraction and storage of the tether cable 26 possible.

In general, the performance of optical fibers is greatly affected by small-radius bends. For example, standard single-mode fiber experiences high optical attenuation at small-radius bends. Advanced optical fibers developed by Corning Incorporated, including nanostructured fibers, experience significantly less optical attenuation at small-radius bends, with a few bends at a 5-mm radius and numerous bends at a 10-mm radius being acceptable without significant optical attenuation. The retraction mechanism 24 of the present invention includes a bend-limiting feature that exploits these advances in a small form factor.

Figure 3:
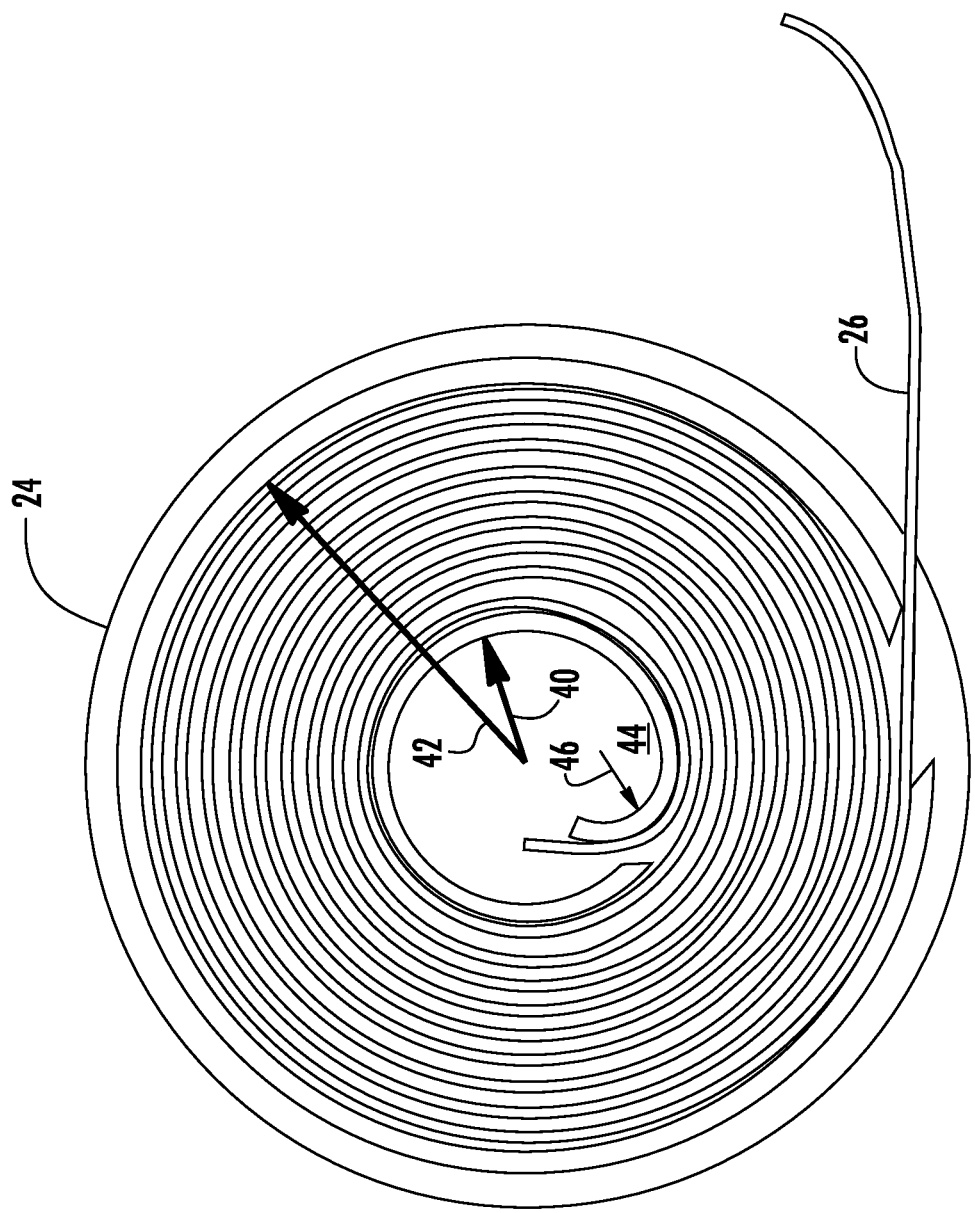
FIG. 3 is a cross-sectional top view of one exemplary (single-port) embodiment of the retraction mechanism of FIGS. 1 and 2, highlighting a bend-limiting feature of the spool.
Figure 4:
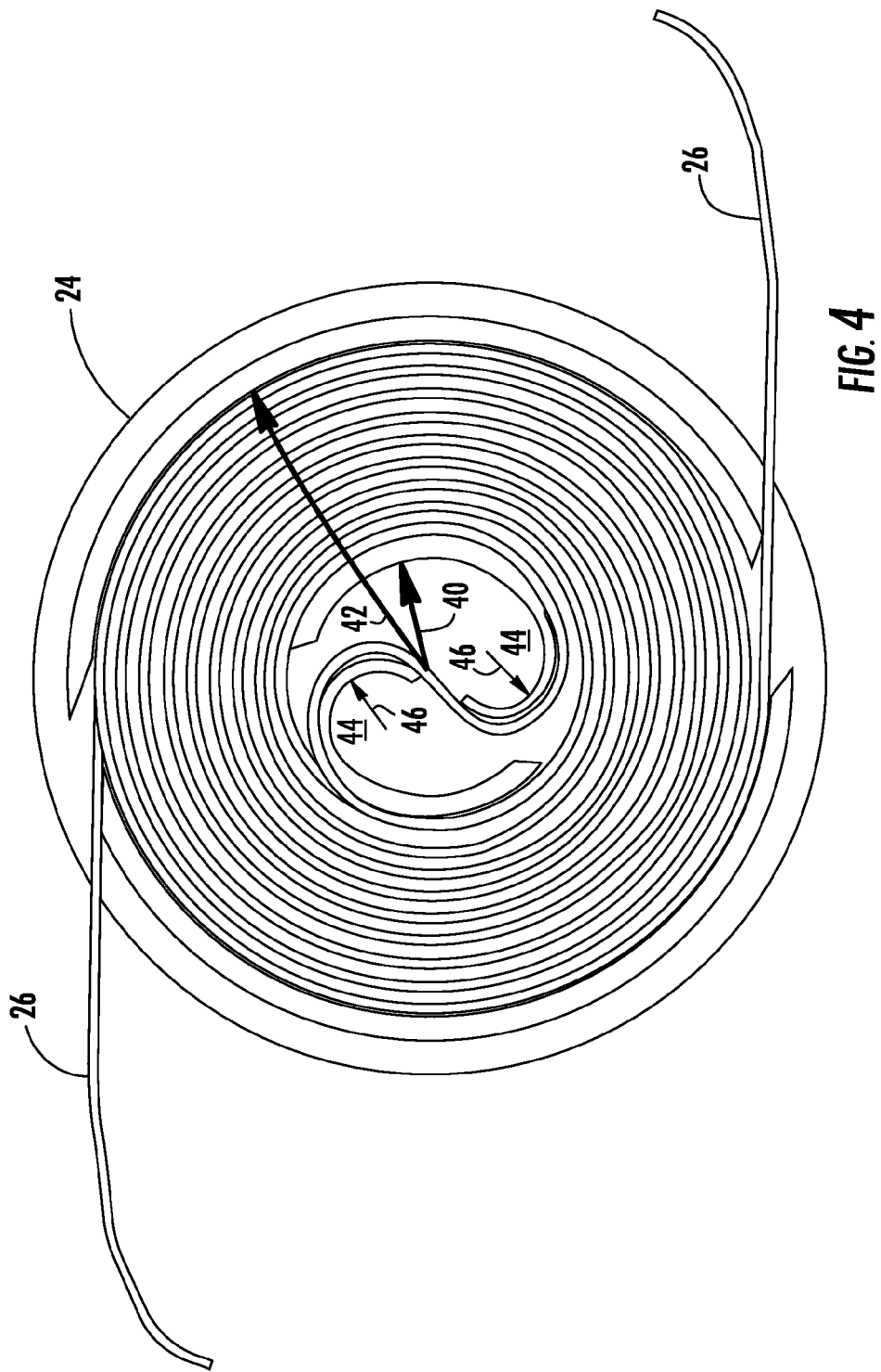
FIG. 4 is a cross-sectional top view of another exemplary (dual-port) embodiment of the retraction mechanism of FIGS. 1 and 2, again highlighting a bend-limiting feature of the spool.

Referring to FIGS. 3 and 4, in two exemplary (single-port and dual-port) embodiments, the retraction mechanism 24 has an inner radius 40 of greater than about 10 mm and an outer radius 42 that is greater than that (e.g., about 27.5 mm), such that when the tether cable 26 is spooled between the inner radius 40 and the outer radius 42, significant optical attenuation is avoided. The bend limiting feature 44 has a radius 46 of greater than about 5 mm, such that when the tether cable 26 is retained by the bend limiting feature 44, significant optical attenuation is avoided. A retraction mechanism 24 sized on the order of the dimensions provided would have an extractable tether cable length of about 500 mm, assuming an optical fiber thickness of about 0.9 mm and that about 10 loops are disposed within the carousel. If the outer radius 42 is extended to 35 mm, for example, the retraction mechanism 24 would have an extractable tether cable length of about 1000 mm. Thus, a housing 30 (FIG. 2) having a width of just over 3 inches would provide meters of tether cable 26.

The spring action required for retraction of the tether cable 26 is accomplished by providing the tether cable 26 with a predetermined bending or spring characteristic, via the selection of materials and/or the incorporation of one or more strength members, one or more anti-flexion members, etc. Preferably, the tether cable 26 is of a substantially flat shape, a substantially round shape, etc. A substantially round-shaped tether cable 26 is typically used when the desired bending or spring characteristic is provided by an external spring (not illustrated) or the like disposed within the retraction mechanism 24.

Figure 5:
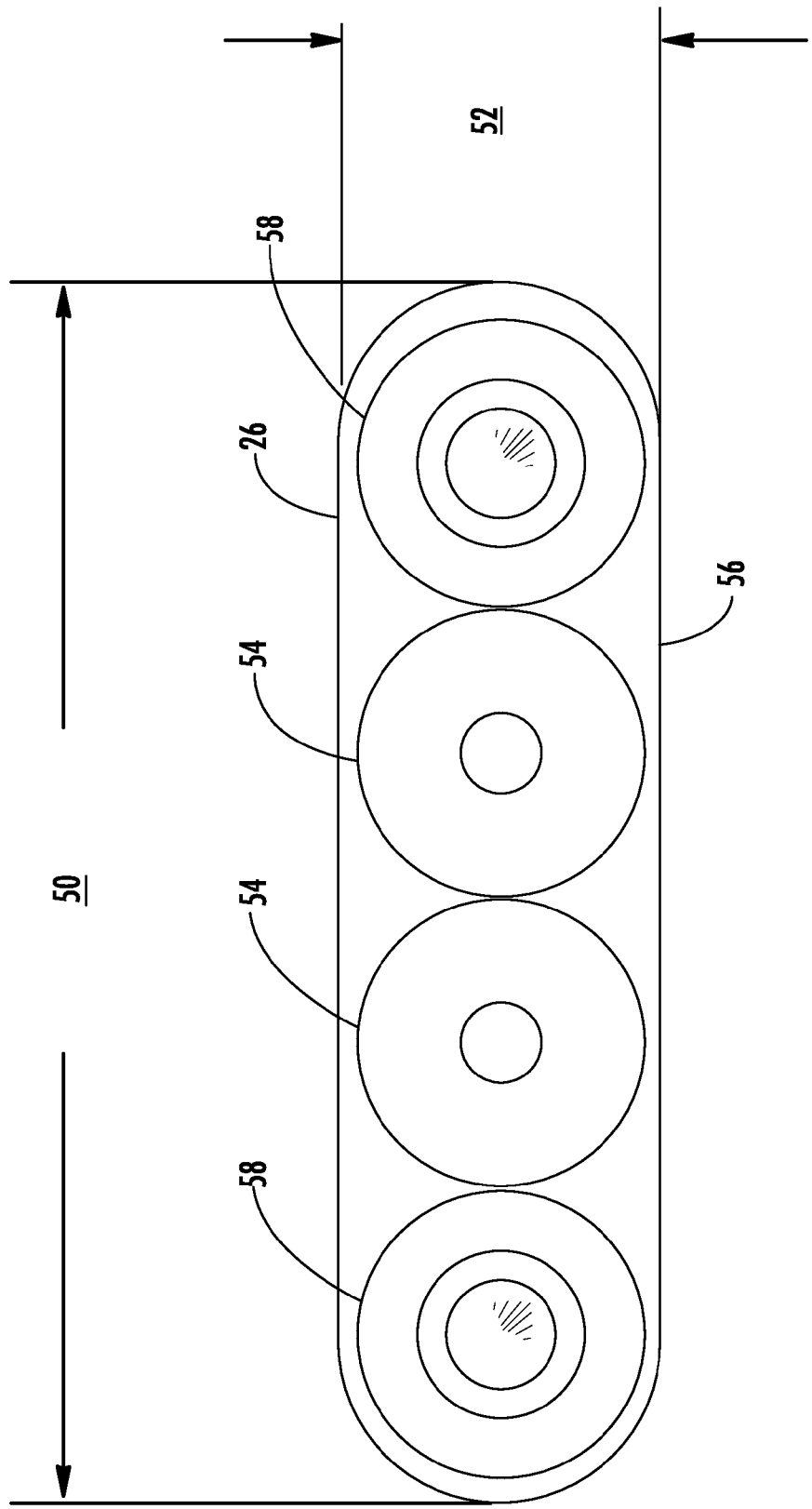
FIG. 5 is a cross-sectional end view of one exemplary embodiment of the tether cable of the present invention, the tether cable including a pair of tight-buffered optical fibers and a pair of copper-clad spring steel strength/anti-flexion members.

Referring to FIG. 5, in one exemplary embodiment, the tether cable 26 of the present invention is substantially flat shaped with a width 50 of about 3.8 mm and a thickness 52 of about 1 mm, although it will be readily apparent to those of ordinary skill in the art that other suitable dimensions may be used. The tether cable 26 includes a pair of tight-buffered optical fibers 54 disposed within an ultraviolet (UV)-curable matrix material 56. The matrix material 56 includes a silicone component that acts as a solid-film lubricant when the tether cable 26 is spooled/unspooled. The tether cable 26 also includes a pair of copper-clad spring steel strength/anti-flexion members 58. Optionally, the spring steel is silicon-manganese steel or chrome-vanadium steel. These strength/anti-flexion members 58 provide the desired electrical conductivity in WLAN antenna array and other similar applications. It will be readily apparent to those of ordinary skill in the art that other suitable materials and configurations may be used.

Figure 6:
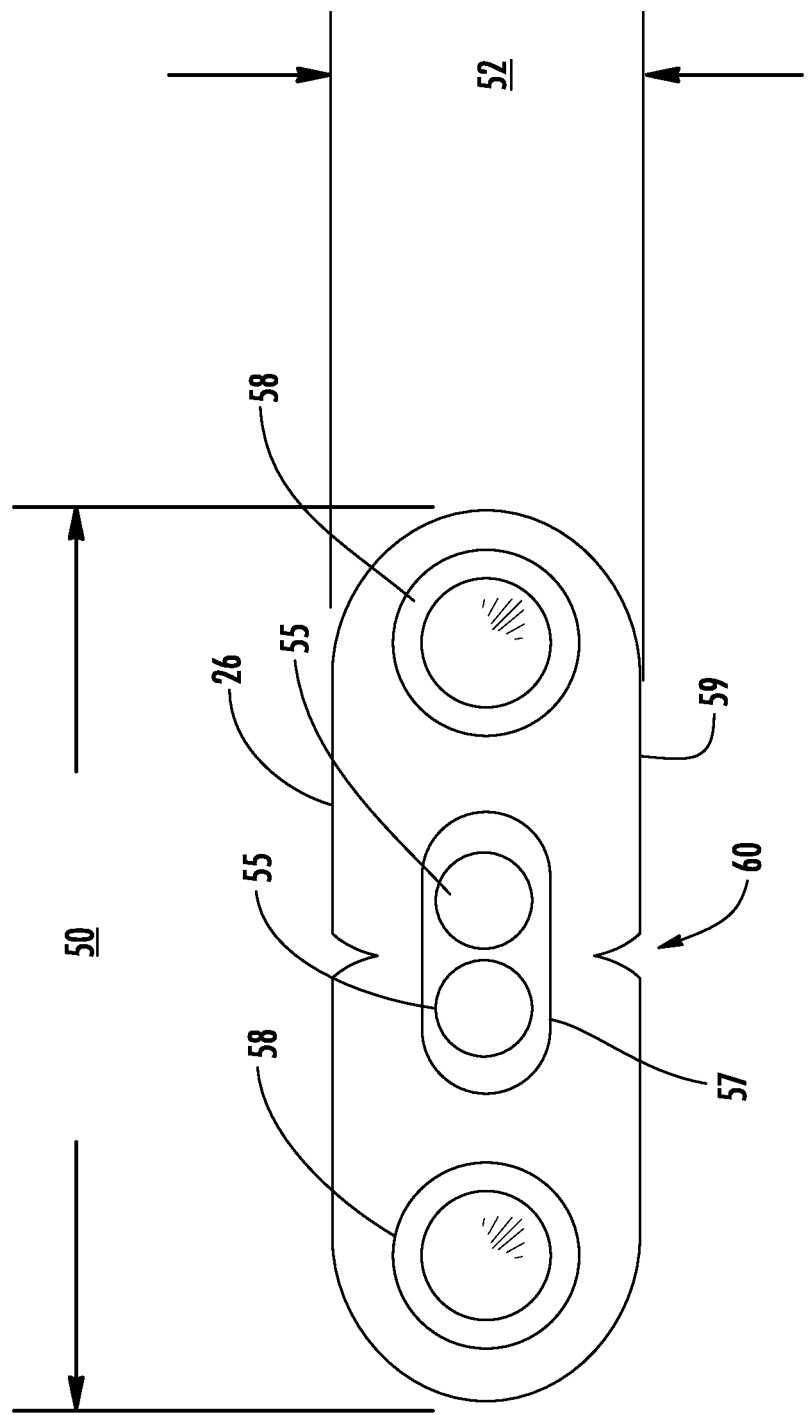
FIG. 6 is a cross-sectional end view of another exemplary embodiment of the tether cable of the present invention, the tether cable including a pair of optical fibers disposed within a ribbon and a pair of copper-clad spring steel strength/anti-flexion members.

Referring to FIG. 6, in another exemplary embodiment, the tether cable 26 of the present invention is substantially flat shaped with a width 50 of about 2.5 mm and a thickness 52 of about 0.9 mm, although it will be readily apparent to those of ordinary skill in the art that other suitable dimensions may be used. The tether cable 26 includes a pair of optical fibers 55 disposed within a ribbon 57, instead of being tight-buffered. The ribbon 57 is disposed within a jacket 59 made of a flame retardant material, such as polyvinylidene diflouride (PVDF) or highly-filled polyvinyl chloride (PVC). Thus, in this embodiment, the tether cable 26 is designed to achieve a plenum flame rating. The jacket 59 also acts as an insulator.

Again, the tether cable 26 includes a pair of copper-clad spring steel strength/anti-flexion members 58. Optionally, the spring steel is silicon-manganese steel or chrome-vanadium steel. These strength/anti-flexion members 58 provide the desired electrical conductivity in WLAN antenna array and other similar applications. Further, the tether cable 26 includes a pair of access point stress risers 60 that enable easy tearing of the jacket 59 so that the optical fibers 55 may be accessed. It will be readily apparent to those of ordinary skill in the art that other suitable materials and configurations may be used.

Figure 7:
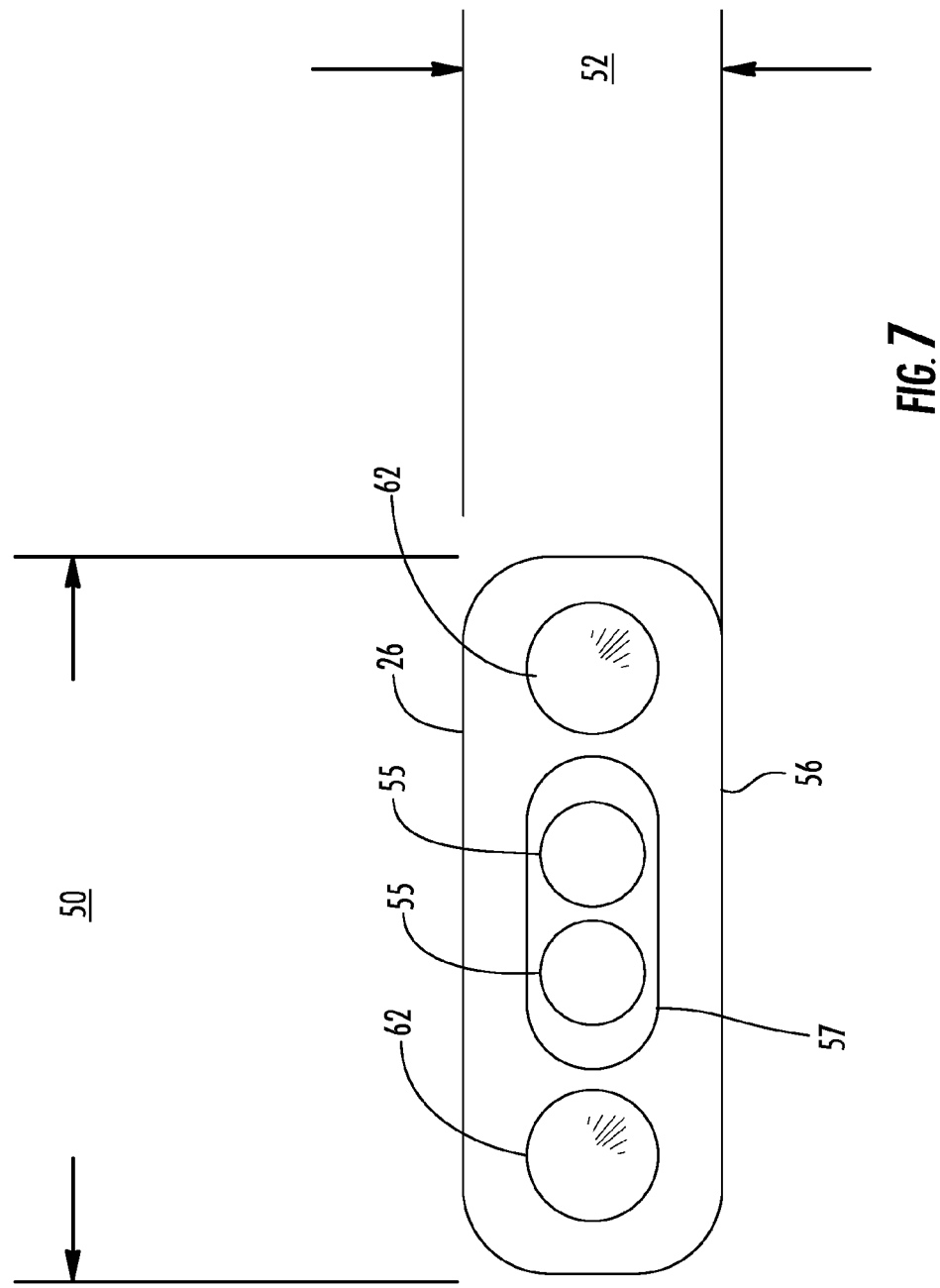
FIG. 7 is a cross-sectional end view of a further exemplary embodiment of the tether cable of the present invention, the tether cable including a pair of optical fibers disposed within a ribbon and a pair of copper conductive members.

Referring to FIG. 7, in a further exemplary embodiment, the tether cable 26 of the present invention is substantially flat shaped with a width 50 of about 1.8 mm and a thickness 52 of about 0.6 mm, although it will be readily apparent to those of ordinary skill in the art that other suitable dimensions may be used. Again, the tether cable 26 includes a pair of optical fibers 55 disposed within a ribbon 57, instead of being tight-buffered. The ribbon 57 is disposed within a UV-curable matrix material 56. The matrix material 56 includes a silicone component that acts as a solid-film lubricant when the tether cable 26 is spooled/unspooled. The matrix material 56 also acts as an insulator. The tether cable 26 also includes a pair of copper conductive members 62. These conductive members 62 provide the desired electrical conductivity in WLAN antenna array and other similar applications. Preferably, a short length of spring steel or the like (not illustrated) is attached to the tether cable 26 in order to provide the tether cable 26 with the desired bending or spring characteristic. Optionally, the spring steel is silicon-manganese steel or chrome-vanadium steel. In this embodiment, a coiled spring or the like (not illustrated) is disposed beneath the rotating flange of the retraction mechanism 24 (FIGS. 1-4) in order to provide the desired retraction force. It will be readily apparent to those of ordinary skill in the art that other suitable materials and configurations may be used.

In order to further increase the strength of the tether cable(s) 26 (FIGS. 5-7), one or more strength members, such as aramid yarn, fiberglass yarn, etc., may be used. Optionally, these strength members are disposed between the optical fibers 54 and 55 (FIGS. 5-7) and the conductive members 62 (FIG. 7).

Figure 8:
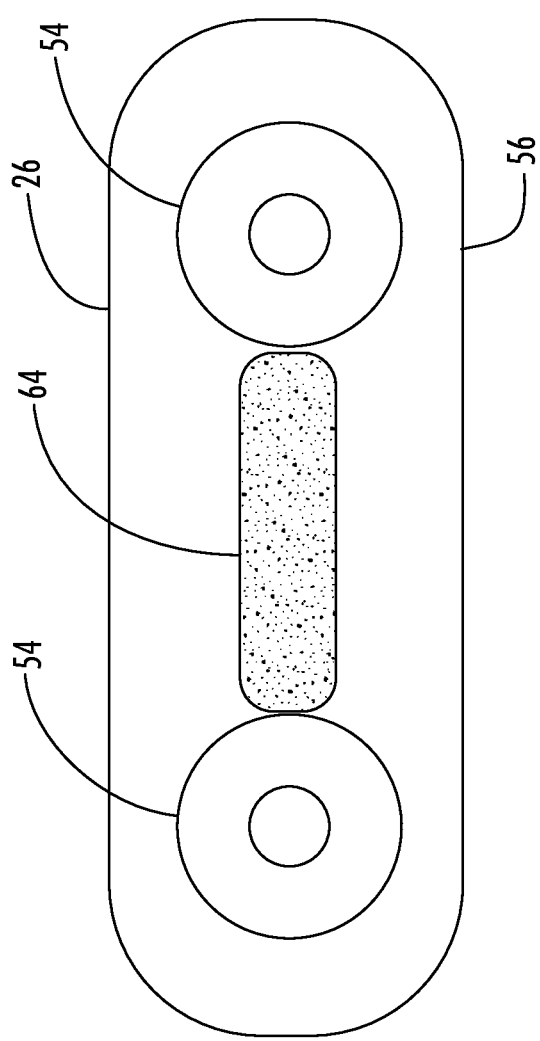
FIG. 8 is a cross-sectional end view of a still further exemplary embodiment of the tether cable of the present invention, the tether cable including a pair of tight-buffered optical fibers and a substantially flat shaped strength/anti-flexion member.

Referring to FIG. 8, in a still further exemplary embodiment, the tether cable 26 of the present invention again includes a pair of tight-buffered optical fibers 54 disposed within a UV-curable matrix material 56. The matrix material 56 includes a silicone component that acts as a solid-film lubricant when the tether cable 26 is spooled/unspooled. The tether cable 26 also includes a substantially flat shaped glass-reinforced plastic (GRP) strength/anti-flexion member 64 or the like (e.g., alternatively, a pair of substantially round shaped GRP strength/anti-flexion members). This strength/anti-flexion member 64 provides the tether cable 26 with the desired bending or spring characteristic, in a case in which electrical conductivity is not required. Preferably, the strength/anti-flexion member 64 has a (collective) width that is about three times its thickness in order to minimize twisting of the tether cable 26 during extension/retraction.

Current manufacturing techniques for multi-fiber, tight-buffered fiber optic cables involve stranding both the optical fibers and the aramid yarns. Stranding increases flexibility, and allows for lower-stress bending. When a unit is stranded, there are regions of tension and compression in the unit that may be relieved by longitudinal movement of the unit. However, stranding limits linespeed and production throughput. For example, current manufacturing techniques run at an optical fiber lay length of about 250 mm and an aramid yarn lay length of about 400 mm. For these empirically-established lay lengths, linespeeds are limited to about 40 mpm for low-speed servers and 100 mpm for high-speed servers. These limitations are driven by the functional stability of the aramid yarn packages. In addition, the current run lengths are limited to aramid yarn lengths as held on the cop. The application of a parallel aramid yarn would allow for the switching out of the aramid yarn on the fly, preventing having to bring the line down to set up new aramid yarn packages. The elimination of stranding would also eliminate dibbers and outer-layer fiber oscillators, depending on the fiber optic cable diameter. This would shorten manufacturing line footprints, reduce equipment costs, and simplify setup.

Optical fiber steps present a manufacturing yield problem with small-diameter, single-fiber cables. This problem is caused by shrinkage of the jacket materials over time. These steps show up after manufacturing and result in fiber optic cables that need reworking, or are scrapped.

Again, in general, the performance of optical fibers is greatly affected by small-radius bends. For example, standard single-mode fiber experiences high optical attenuation at small-radius bends. Advanced optical fibers developed by Corning Incorporated experience significantly less optical attenuation at small-radius bends, with a few bends at a 5-mm radius and numerous bends at a 10-mm radius being acceptable without significant optical attenuation.

Figure 9:
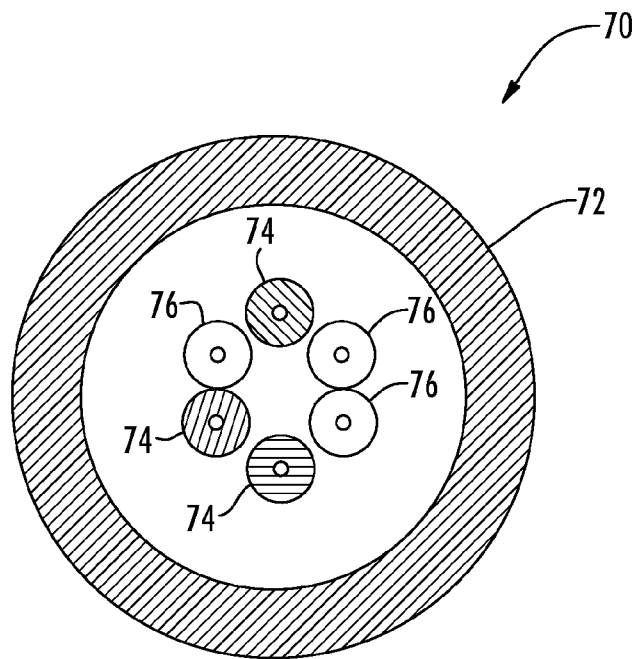
FIG. 9 is a cross-sectional end view of a still further exemplary embodiment of a tight-buffered fiber optic cable of the present invention, the fiber optic cable including a parallel aramid yarn for tensile strength and crush protection.
Figure 10:
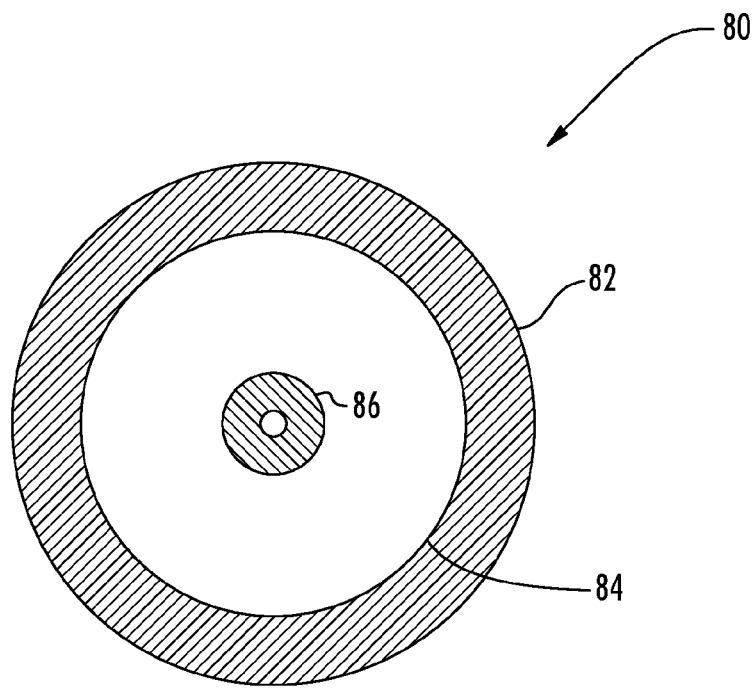
FIG. 10 is a cross-sectional end view of a still further exemplary embodiment of a single-fiber fiber optic cable of the present invention, the fiber optic cable again including a parallel aramid yarn for tensile strength and crush protection.

As a result of the above, several other fiber optic cable configurations are presented herein. The first configuration is a family of multi-fiber fiber optic cables with single-mode optical fibers. The fiber optic cables may contain up to twenty-four tight buffers. Referring to FIG. 9, in one exemplary embodiment (i.e. a six-fiber design), the fiber optic cable 70 includes a jacket 72 that typically consists of a PVC material. The jacket material is selected to meet either plenum or riser flame performance requirements. The aramid yarn 74 provides tensile strength and protects the optical fibers 76 from crush. The optical fibers 76 are generally stranded in the cable, but may also be parallel based on the ability of the optical fiber to reduce bending attenuation. The second configuration is a family of single and multi-fiber fiber optic cables with single-mode optical fibers. Referring to FIG. 10, in another exemplary embodiment (i.e. a one-fiber design), the fiber optic cable 80 includes a jacket 82 that typically consists of a PVC material. Again, the jacket material is selected to meet either plenum or riser flame performance requirements. The aramid yarn 84 surrounds the optical fiber(s) 86, which are either stranded in the fiber optic cable 80 or paid-off parallel in a non-stranded configuration. In either of these exemplary embodiments, the fiber optic cable 70 and 80 may have a ripcord or the like for easy access.

Figure 11:
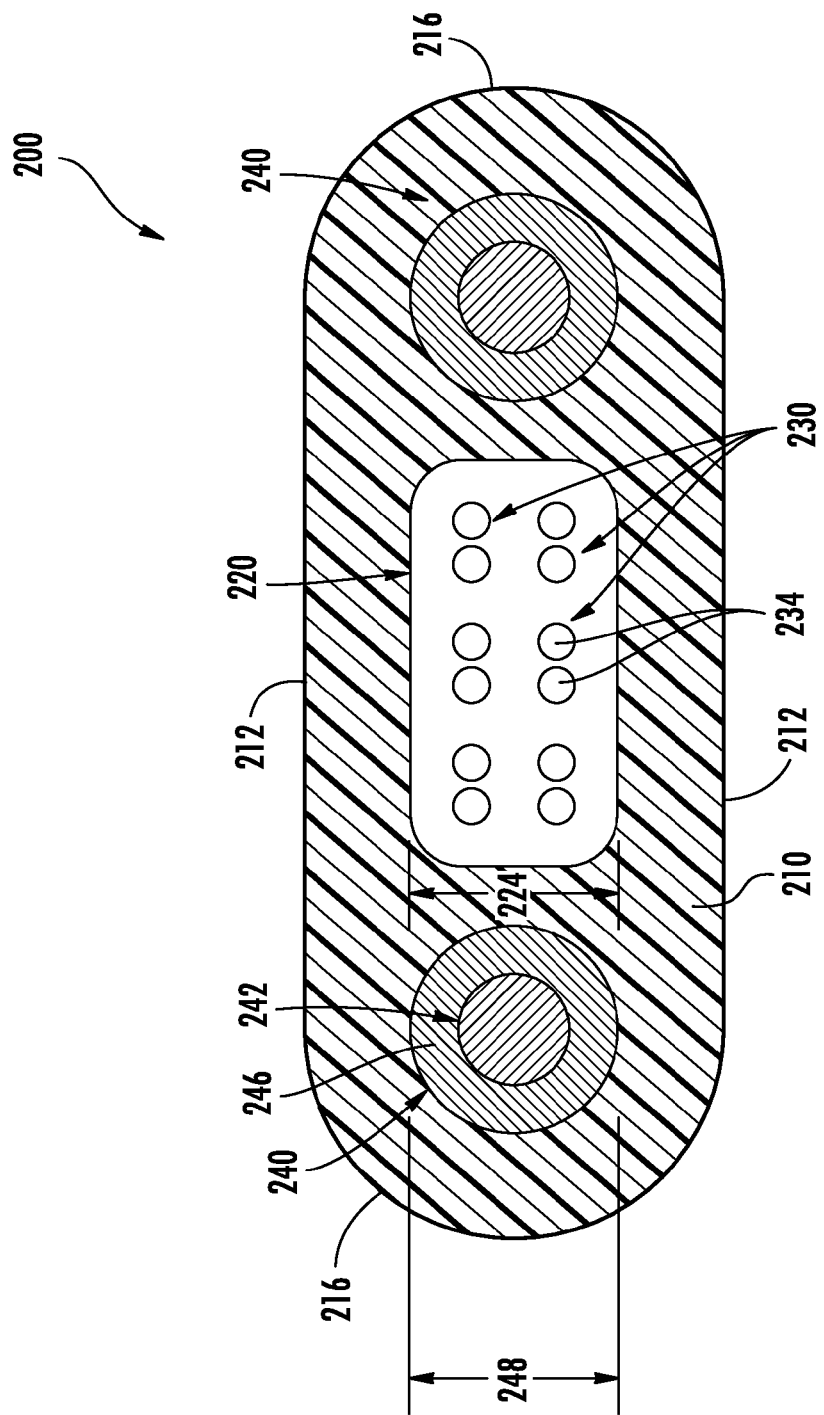
FIG. 11 is a cross-sectional end view of an exemplary embodiment of a fiber optic array cable of the present invention.

FIG. 11 illustrates a fiber optic array cable 200 according to an embodiment of the invention. The cable 200 comprises a cable jacket 210 having opposed generally flat surfaces 212 and curved end surfaces 216. A buffer cavity 220 is formed in the cable jacket 210 with a plurality of optical fibers or multi-fiber ribbons 230 enclosed therein. In the exemplary embodiment, six ribbons 230 with two optical fibers 234 each are disposed in the cavity 220, although other combinations of individual fibers or ribbon type and number of ribbon fibers can be used. The buffer cavity has a height 224 of about 2 mm. The tether cable 200 also includes a pair of strength/anti-flexion conductor members 240 comprising a spring steel core 242 cladded with copper 246. One member 240 is located on each on each side of the cavity 220. The outside diameter 248 of the members 240 can correspond to the height 224 of the cavity 220. Optionally, the members 240 can be silicon core-manganese steel clad or chrome core-vanadium steel clad. The members 240 provide the desired electrical conductivity in WLAN antenna array and other similar applications. Still referring to FIG. 11, the excess fiber length for the cable 200 can be in the range of 0.4% to 0.5%.

Figure 12:
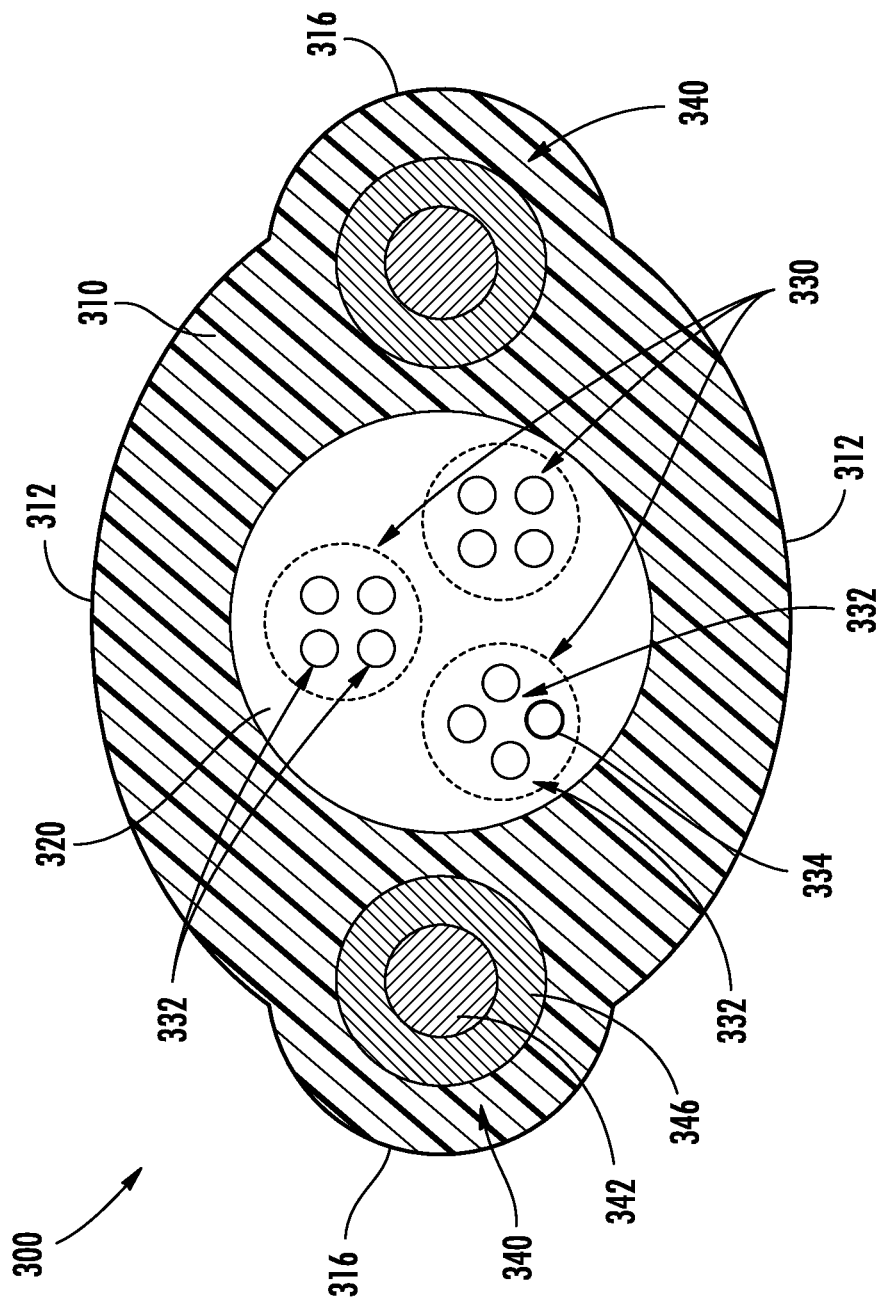
FIG. 12 is a cross-sectional end view of another exemplary embodiment of a fiber optic array cable of the present invention.

FIG. 12 illustrates a fiber optic array cable 300 according to another embodiment of the invention. The cable 300 comprises a cable jacket 310 having opposed curved upper and lower surfaces 312 and curved end surfaces 316. A buffer cavity 320 is formed in the cable jacket 310 with a plurality of stranded fibers or multi-fiber ribbon pairs 330 enclosed therein. In the exemplary embodiment, each stranded ribbon pair comprises a pair of ribbons 332 stranded about one another, each ribbon having two optical fibers 334, although other combinations of individual fibers and/or ribbon type and number of ribbon fibers can be used. The fibers or ribbons 332 of the pairs 330 can be, for example, helically or SZ stranded. The cable 300 also includes a pair of strength/antiflexion conductor members 340 comprising a spring steel core 342 cladded with copper 346. One member 340 is located on each on each side of the cavity 320. Optionally, the members 340 can be silicon core-manganese steel clad or chrome core-vanadium steel clad. The members 340 provide the desired electrical conductivity in WLAN antenna array and other similar applications.

Figure 13:
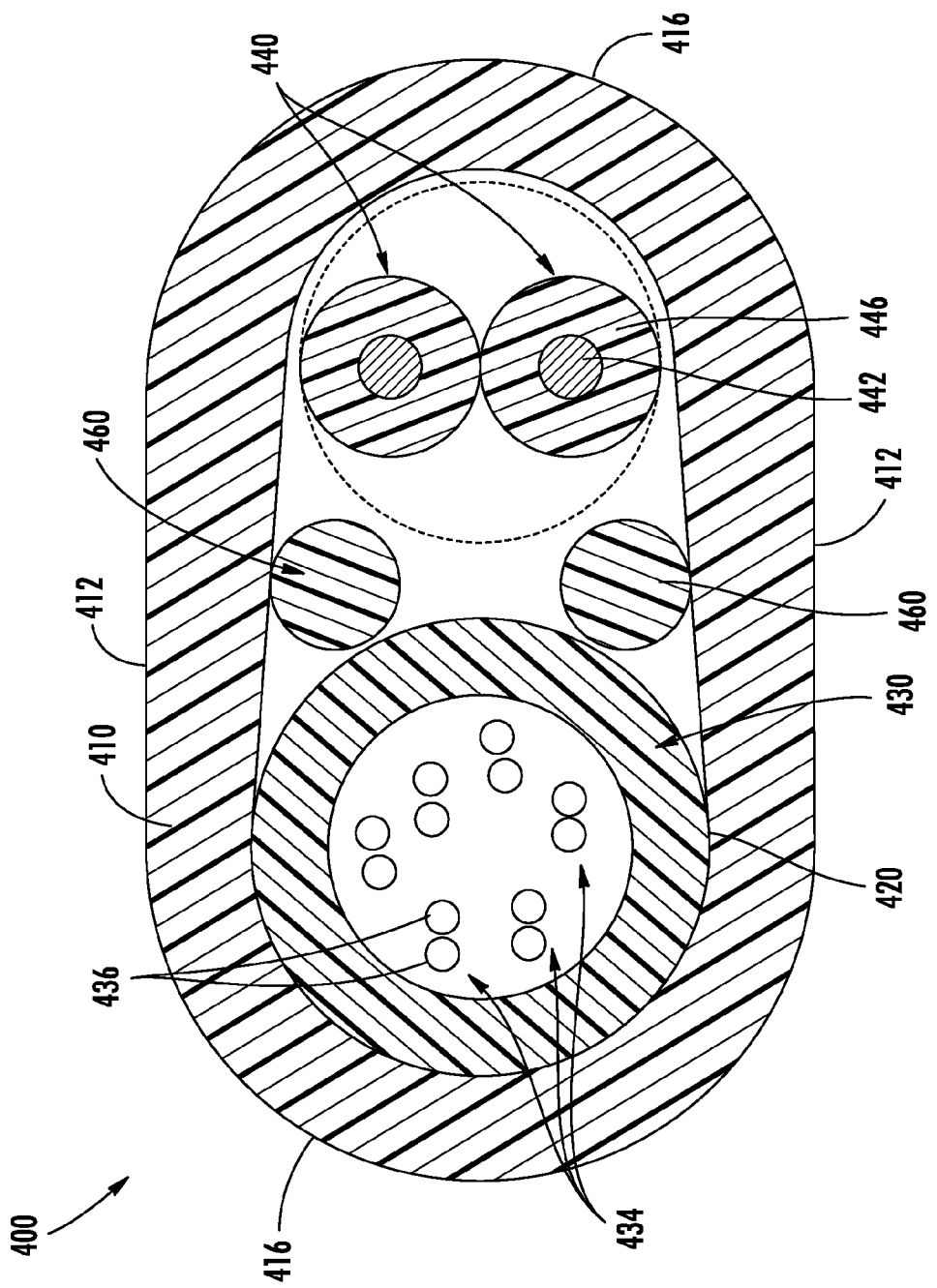
FIG. 13 is a cross-sectional end view of a still further exemplary embodiment of a fiber optic array cable of the present invention.

FIG. 13 illustrates a fiber optic cable 400 according to another embodiment of the invention. The cable 400 comprises a cable jacket 410 having opposed generally flat upper and lower surfaces 412 and curved end surfaces 416 connecting the flat surfaces. A buffer cavity 420 is formed in the cable jacket 410. A buffer tube 430 is included in the cavity 420, with a plurality of fibers or multi-fiber ribbons 434 enclosed therein. In the exemplary embodiment, six ribbons 434 with two optical fibers 436 each are disposed in the buffer tube 430, although other combinations of individual fibers and/or ribbon type and number of ribbon fibers can be used. The cable 400 also includes a pair of insulated conductors 440 each comprising a metallic, such as copper, for example, conductor 442 and insulation 446. The conductors 440 are arranged in the cavity 420 so that they can contact the buffer tube 430 at one or more locations. The conductors 440 provide the desired electrical conductivity in WLAN antenna array and other similar applications, and can be helically or SZ stranded together. The conductors 440 can be sized to carry 50V DC current, such as 22, 20, 18, or 16 AWG copper conductors. One or more strength members 460 may be included in the cavity 420 to increase the tensile strength of the cable 400. In the exemplary embodiment, the strength members 460 are small GRP rods. As an alternative to or in addition to GRP rods, one or more aramid yarn strength elements could be disposed in the jacket 410 cavity to provide tensile strength. A ripcord (not illustrated) can also be disposed in the jacket 410 cavity to facilitate access the optical fibers 436.

In the above embodiments, the array cables may be made from selected materials so as to achieve properties such as plenum or LSZH flame ratings. The cables may be made of materials suitable for outdoor use, and may include water blocking components and materials. For example, the cables can include yarns or tapes containing superabsorbent polymers. The jackets and buffer tubes can be made from materials such as PVC, including plenum-rated PVC.

Figure 14:
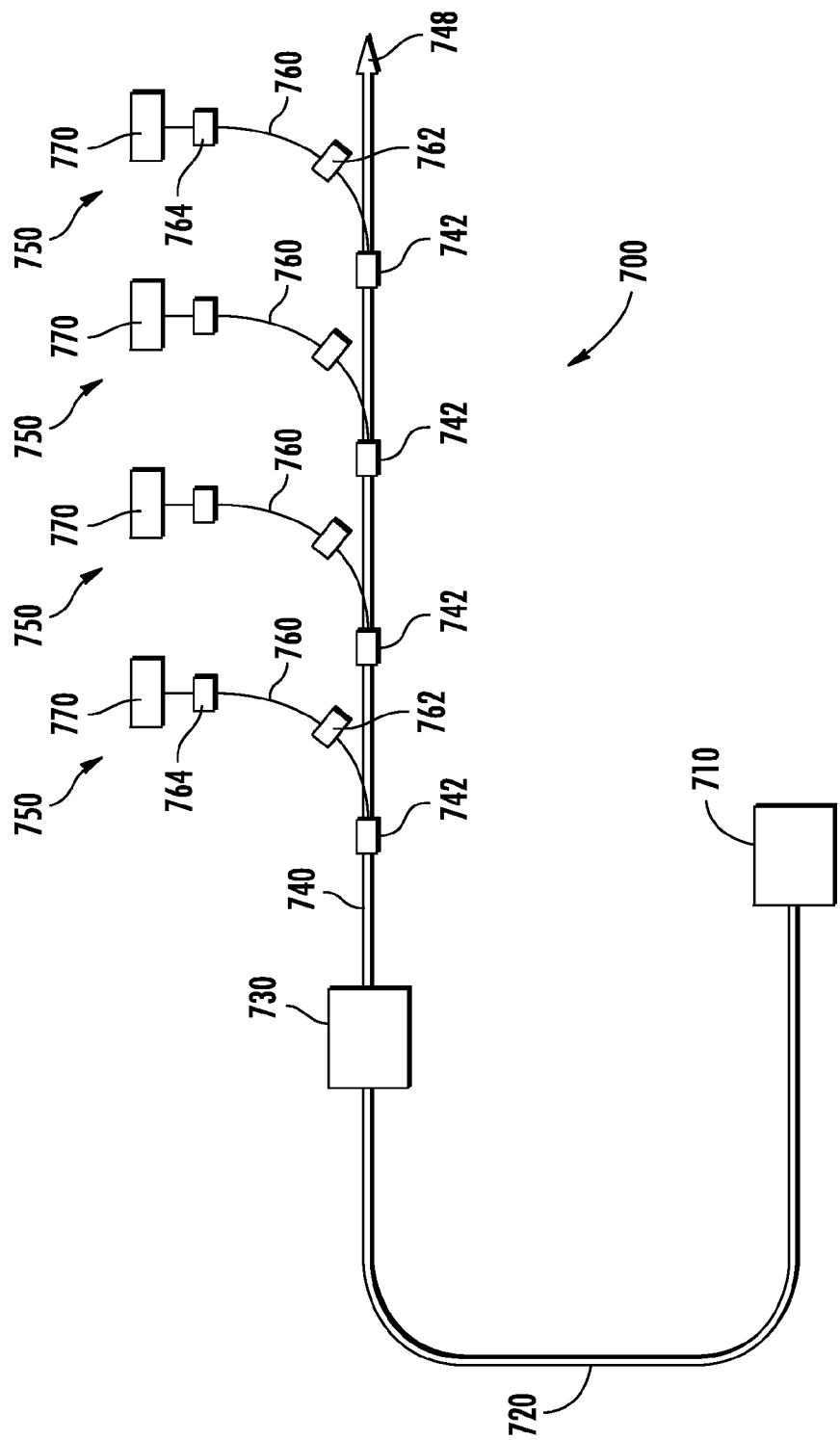
FIG. 14 is a schematic view of another exemplary embodiment of an optical system of the present invention.

FIG. 14 is a schematic view of an optical system 700 in the form of an exemplary WLAN application. In the exemplary system 700, each of the optical fiber tether assemblies can include a connectorized transceiver and associated software. Thus, each of the optical fiber tether assemblies can function as an antenna. The associated fiber optic cable carries both optical fiber to provide optical continuity and copper wire to provide electrical conductivity to the antenna array.

Referring to FIG. 14, the optical system 700 includes a tail cable 720 that optically couples a patch panel in a wiring closet or other optical signal source 710 at one location to multiple optical connectors, a coupler, or the like 730 at another location. These locations may be separated by feet, yards, miles, etc. An array cable 740 optically couples the optical connectors, coupler, or the like 730 to one or more tether cable assemblies 750 at one or more access points 742, such as one or more FLEXNAPS or the like. Optionally, the tail cable 720 and the array cable 740 may be integrally formed. The array cable 740 includes a pulling grip 748 for pulling the array cable 740 over distances, through walls, ceilings, etc., typically through a conduit.

The cable assemblies 750, which are preferably pre-connectorized, then bring the optical signal to multiple other locations. The cable assemblies 750 allow an array of optical devices may be installed with minimal effort and expense. Each of the tether cable assemblies 750 includes one or more fiber optic cables 760 and a device 770, as described in greater detail herein below. One or more of the fiber optic cables 760 can be connected at one or more connectors. In the exemplary embodiment, each cable 760 is connected at connectors 762, 764, although other arrangements are possible.

The device 770 may be one or more optical devices such as optical connectors or ports, a FLEXNAP, a transceiver and associated software in the exemplary WLAN application, etc.

According to one aspect of the present embodiment, one or more of the access points 742 can be selectively tapped and connected to an assembly such as the illustrated cable assemblies 750. The system 700 can include a series of access points 742 along the length of the array cable 740, either at regular or irregular intervals. Therefore, a variety of locations along the array cable can be provided with a cable assembly 750. Further, the devices 770 of the cable assemblies can be interchangeable with similar devices so that they are easily replaceable. In addition or as an alternative to interchangeability with similar devices, the cable assemblies 750 can include varying types of devices 770 so that each location can be served by a device of varying functionality. Examples of devices 770 that can be used in the cable assemblies 750 include transceivers such as electrical-to-optical transceivers.

At each access point 742, one or more of the optical fibers (not shown) in the array cable 740 can be cut and spliced to a cable 760. One or more connection points 762, 764 can be included in the cable assemblies 750. In the exemplary embodiment, a pair of optical fibers from the array cable 740 is cut and spliced at each access point 742.

The array cable 760 used in the system 700 can be any of the cables 200, 300, 400 illustrated in FIGS. 11-13, for example. The cables 200, 300, 400 each include pairs of optical fibers suitable for splicing with a two-fiber cable 760. The conductors 240, 340, 460 in the respective cables 200, 300, 400 can be used to provide electrical power to the devices 770. Power to the conductors 240, 340, 460 can be supplied via the tail cable 720 or at 730.

Suitable optical fibers for use in the cables disclosed in this application include single and multi-mode optical fibers, such as optical fibers available from Corning Incorporated under the trademarks InfiniCor®, SMF-28®, Vascade®, SMF-28e®, ClearCurve®, and LEAF®.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A fiber optic array cable, comprising:
a PVC jacket having a cavity, a pair of opposed generally flat surfaces, and a pair of curved end surfaces;
at least twelve optical fibers disposed within the cavity; and
a pair of electrical conductors encased within the jacket and on opposite sides of the cavity, wherein the electrical conductors are sized to carry 50V DC current, wherein each of the electrical conductors includes a core and a cladding that are coaxial,
wherein the cladding comprises manganese and steel or wherein the cladding comprises vanadium and steel.

2. A fiber optic array cable, comprising:
a PVC jacket having a cavity, a pair of opposed generally flat surfaces, and a pair of curved end surfaces;
at least twelve optical fibers disposed within the cavity; and
a pair of electrical conductors encased within the jacket and on opposite sides of the cavity, wherein the electrical conductors are sized to carry 50V DC current,
wherein the cavity is a buffer cavity formed in the cable jacket with the optical fibers enclosed therein,
wherein excess fiber length for the cable is in the range of 0.4% to 0.5%.

* * * * *